United States Patent
Hudson (10) Patent No.: US 10,263,727 B2
(45) Date of Patent: Apr. 16, 2019

(54) SYSTEM AND METHOD FOR MITIGATING NARROWBAND INTERFERENCE

(71) Applicant: BOOZ ALLEN HAMILTON INC., McLean, VA (US)

(72) Inventor: Frank Hudson, Monument, CO (US)

(73) Assignee: BOOZ ALLEN HAMILTON INC., McLean, VA (US)

(*) Notice: Subject to any disclaimer, the term of this patent is extended or adjusted under 35 U.S.C. 154(b) by 61 days.

(21) Appl. No.: 15/477,429

(22) Filed: Apr. 3, 2017

(65) Prior Publication Data
US 2018/0013514 A1 Jan. 11, 2018

Related U.S. Application Data

(60) Provisional application No. 62/358,706, filed on Jul. 6, 2016.

(51) Int. Cl.
H04B 1/10 (2006.01)
H04K 3/00 (2006.01)
H04B 17/20 (2015.01)

(52) U.S. Cl.
CPC ............ *H04K 3/228* (2013.01); *H04B 1/109* (2013.01); *H04B 1/1036* (2013.01); *H04B 17/20* (2015.01); *H04K 3/90* (2013.01)

(58) Field of Classification Search
CPC ...... H04B 17/20; H04B 1/1036; H04B 1/109; H04K 3/228; H04K 3/90
USPC .......................................................... 455/307
See application file for complete search history.

(56) References Cited

U.S. PATENT DOCUMENTS

| 7,716,712 B2 | 5/2010 | Booth et al. |
| 8,407,020 B1* | 3/2013 | Baggenstoss ......... G06F 17/141 702/75 |
| 8,804,884 B2 | 8/2014 | Maltsev et al. |
| 9,215,012 B2 | 12/2015 | Holder et al. |

(Continued)

OTHER PUBLICATIONS

International Search Report (PCT/ISA/210) dated Oct. 24, 2017, by the Korean Intellectual Property Office as the International Searching Authority for international Application No. PCT/US2017/040576 (3 pages).

(Continued)

*Primary Examiner* — Ajibola A Akinyemi
(74) *Attorney, Agent, or Firm* — Buchanan Ingersoll & Rooney PC (57) ABSTRACT

A system and method for mitigating interference of a radio frequency (RF) signal includes a receiver configured to include: a decomposition module that decomposes a received RF signal into sub-bands via a multi-stage filter, each sub-band being configured to operate on real and imaginary components of the RF signal, and each stage being scaled for separating time-frequency content of the desired signal from time-frequency content of the interference; a mitigation module that suppresses the interference of the RF signal in each sub-band by zeroing an output of a respective sub-band when the frequency content exceeds a predetermined threshold; and a reconstruction module that reconstructs the RF signal from the mitigation module minus the interference. The receiver is configured to determine whether the multi-stage filter is to be reinitialized with updated time and frequency resolution requirements to improve system response.

20 Claims, 9 Drawing Sheets

(56) References Cited

U.S. PATENT DOCUMENTS

| | | | | |
|---|---|---|---|---|
| 2005/0156775 A1* | 7/2005 | Petre | ............... | H03M 1/121 |
| | | | | 341/155 |
| 2007/0002986 A1* | 1/2007 | Green | ............ | H04L 25/4917 |
| | | | | 375/353 |
| 2008/0310479 A1* | 12/2008 | Koslar | ............. | H04B 1/692 |
| | | | | 375/131 |
| 2013/0238345 A1* | 9/2013 | Ekstrand | .......... | G10L 19/0208 |
| | | | | 704/500 |
| 2014/0313910 A1 | 10/2014 | Appleton | | |
| 2014/0314002 A1 | 10/2014 | Hanson et al. | | |
| 2018/0019774 A1* | 1/2018 | Hampel | ......... | H04L 25/03006 |

OTHER PUBLICATIONS

Written Opinion (PCT/ISA/237) dated Oct. 24, 2017, by the Korean Intellectual Property Office as the International Searching Authority for International Application No. PCT/US2017/040576 (5 pages).

Musumeci et al., "Use of the Wavelet Transform for Interference Detection and Mitigation in Global Navigation Satellite Systems", International Journal of Navigation and Observation, Feb. 26, 2014, pp. 1-14, Article ID 262186.

Bayram, "An Analytic Wavelet Transform with a Flexible Time-Frequency Covering", IEEE Transactions on Signal Processing, Mar. 2013, pp. 1131-1142, vol. 61, No. 5.

* cited by examiner

SYSTEM AND METHOD FOR MITIGATING NARROWBAND INTERFERENCE

FIELD

The present disclosure relates to mitigating interference, and particularly to mitigating narrowband interference in a radio frequency signal.

BACKGROUND

The Global Positioning System (GPS) is used across many facets of society. Individuals and private organizations can be reliant on GPS for leisure and/or to provide services to customers. Government agencies can use GPS in the course of providing general as well as emergency services. Often, the expediency and consistency of the services is subject to the integrity of the received GPS signal. The integrity of the GPS signal at the receiver is essential for ensuring the generation of Position, Navigation, and Timing data (PNT). Industrial systems, such as those involving power distribution, transportation, and communications can rely heavily on PNT data for system operation and/or maintenance.

The use of direct spread spectrum coding enables a GPS signal to be processed with receive power well below the noise floor of most receivers. This feature however makes the GPS receiver vulnerable to interference, which has the effect of degrading or preventing reception of a GPS signal. Narrowband interference (e.g., jamming or jammer signals), whether intentional or unintentional is generally in the form of a tone. The tone can be constant or time-varying, such as a pulsed tone, hopped tone, or swept tone. As a result, private and government use of GPS is vulnerable to disruption with commercially available jamming devices.

Known systems describe an approach for suppressing jamming signals using spatial nulling. The system includes a plurality of channels for receiving signals from GPS satellites. Each channel includes an antenna element, receiver, digitizer, and an adaptive notch filter. The notch filters provide outputs to one or plural spatial combiners. Temporal filters are arranged upstream of the spatial combiner so that narrowband jamming signals can be suppressed. Suppression is achieved using adaptive FIR filters that attenuate narrowband jamming signals up to 60 to 80 dB. The GPS signals within the received signals are undistorted, which allows them to be acquired and tracked by the receiver.

Another known technique is directed to the attenuation of frequency swept signals, which sweep across a given frequency band appearing to have a bandwidth that appears greater than it actually is or is pulsed on and off so that it is present during an entire block of anti-jamming processing. The signals are passed through a dyadic filter, which is composed of a plurality of wavelet transforms which allow analysis of the signal in both time and frequency domains. A covariance matrix is generated for each wavelet transformation, and is used to weight the individual elements in the respective wavelet transforms. This enables nulling undesired signal components. An inverse wavelet transform is applied to the nulled wavelet transform to reconstruct the GPS signal.

The dyadic filter decomposes the frequency space equally into low- and high-pass channels and decimates the channel by a factor of two at each stage. As a result, scaling is required at each level to stretch a cell for the low-pass channel and compress a cell for the high-pass channel. This fixed scaling can result in an increase in the number of stages required to successfully process a jammer signal, particularly a frequency agile jammer signal. Moreover, while the dyadic filter can effectively suppress frequency-shifting jamming signals, it is not optimized to process "chirp" type wavelets. The design of a dyadic wavelet transform encompasses a large number of transformers and can be further complex given that scaling, frequency resolution, and shifting cannot be defined independent of one another.

A technique for interference mitigation in a Global Navigation Satellite System (GNSS) is discussed in "Use of the Wavelet Transform for Interference Detection and Mitigation in a Global Navigation Satellite Systems", Luciano Musumeci and Fabio Dovis, International Journal of Navigation and Observation, vol. 2014, article ID 262186, 14 pages (Hindawi Publishing Corporation, Feb. 26, 2014), the entire content of which is hereby incorporated by reference. The wavelet-based mitigation algorithm includes a decomposition phase, a detection-mitigation phase, and a reconstruction phase. In the decomposition phase, a received GNSS signal is filtered using a wavelet transform that is extended to obtain wavelet packet decomposition (WPD). The filter can include any number of stages that is determined by the spectral characteristics of the interference signal. During the mitigation phase, a blanking threshold operation is performed in each scale at the output of the filter bank to suppress the coefficients associated with interference components. In the reconstruction phase, an inverse wavelet packet transform is applied to the wavelet scales. This approach uses wavelet filter banks to obtain a complete decomposition of the received signal and provide Wavelet coefficients. The coefficients representing interference information are blanked using thresholding criteria. The reconstructed signal is free of interference. This technique, however, requires a large number of transformers to isolate the interference while providing the redundancy necessary to reconstruct the environment.

As described in "An Analytic Wavelet Transform With a Flexible Time-Frequency Covering", by Ilker Bayram, IEEE Transactions On Signal Processing, Vol. 61, No. 5, pp. 1131-1142 (Mar. 1, 2013), the entire content of which is hereby incorporated by reference, a known analytic wavelet transform can be designed for specifying the dilation factor, Q-factor, and redundancy. These parameters are not independent of one another as the dilation factor sets an upper bound on the Q-factor, the Q-factor sets an upper bound on the shift parameter, and the redundancy parameter is a function of the dilation, Q-factor, and shifting parameters. A filter bank constructed from the transformer includes a low-pass channel and an analytic high-pass channel. The low-pass channel is iterated to reduce or decompose the frequency space at each stage. The high-pass channel is used for analysis of the signal.

SUMMARY

An exemplary method for mitigating interference in an RF signal is disclosed. The method comprising: initializing a filter for processing a desired signal by estimating time and frequency resolution requirements; receiving the RF signal in a desired frequency band, the RF signal including at least the desired signal and an interference signal; measuring the frequency content of the RF signal; decomposing the RF signal into a plurality of sub-bands via the filter, each sub-band being configured to operate on complex components of the decomposed RF signal, and having a plurality of filter stages where each stage is scaled for separating frequency content of the desired signal from frequency content of the interference signal; suppressing the interference signal of each sub-band by zeroing an output of a sub-band when the respective frequency content exceeds a predetermined threshold; reconstructing the RF signal and generating a filter response; and correlating the filter response to the desired signal, wherein one of the frequency content of the RF signal, the frequency content of the decomposed RF signal, or the filter response is analyzed to determine whether the filter is to be reinitialized with updated time and frequency resolution requirements to improve the filter response.

An exemplary system for mitigating interference in an RF signal that includes at least a desired signal and interference is disclosed. The system comprising: a receiver configured to include: a decomposition module that decomposes a received RF signal into sub-bands via a multi-stage filter, each sub-band being configured to operate on real and imaginary components of the RF signal, and each stage being scaled for separating frequency content of the desired signal from frequency content of the interference; a mitigation module that suppresses the interference of the RF signal in each sub-band by zeroing an output of a respective sub-band when the frequency content exceeds a predetermined threshold; and a reconstruction module that reconstructs the RF signal from the mitigation module and generates a filter response including the reconstructed RF signal minus the interference, wherein the receiver is configured to: compare the filter response to the desired signal to measure system performance; and analyze one of frequency content of the received RF signal, the frequency content of the decomposed RF signal, or the filter response to determine whether the multi-stage filter is to be reinitialized with updated time and frequency resolution requirements to improve system response.

An exemplary processor is disclosed, comprising: a decomposition module configured to decompose a received RF signal into sub-bands via a multi-stage filter, each sub-band being configured to operate on real and imaginary components of the RF signal, and each stage being scaled for separating frequency content of the desired signal from frequency content of the interference signal; a mitigation module configured to suppress the interference of the RF signal in each sub-band by zeroing an output of a respective sub-band when the frequency content exceeds a predetermined threshold; a reconstruction module configured to reconstruct the RF signal from the mitigation module and generate a filter response including the reconstructed RF signal minus the interference; and a signal analyzer module configured to compare the filter response to the desired signal to measure system performance and analyze one of frequency content of the received RF signal, the frequency content of the decomposed RF signal, or the filter response to determine whether the multi-stage filter is to be reinitialized with updated time and frequency resolution requirements to improve the filter response.

BRIEF DESCRIPTION OF THE DRAWINGS

The scope of the present disclosure is best understood from the following detailed description of exemplary embodiments when read in conjunction with the accompanying drawings, wherein.

DETAILED DESCRIPTION

Exemplary embodiments of the present disclosure provide advantages over prior art systems and are directed to a system, apparatus, and method in which a received composite RF signal is transformed via a filter bank into a time-frequency domain whereby the jamming signal (e.g., interference), regardless of time-varying parameters, can be sufficiently isolated. The coefficients associated with the jamming signal are zeroed and the environment is reconstructed minus the interference. As a result, a reduction in the negative effects of degradation in signal correlation or the denial of correlation of the received signal by the jamming signal can be realized.

In accordance with exemplary embodiments described herein, the filter bank can provide a significant reduction in the number of transformers as a function of the number of stages, J. Whereas known techniques using wavelet packet decomposition (WPD) require $2^J-1$ transformers, the filter bank described in accordance with embodiments of the present disclosure have J stages.

Exemplary embodiments are also directed to a system which can determine whether the filter should be reinitialized with new parameters based on an analysis of the frequency content of the received signal prior to and after signal conditioning and/or an analysis of the quality of the received signal prior to and after signal conditioning.

Figure 1:
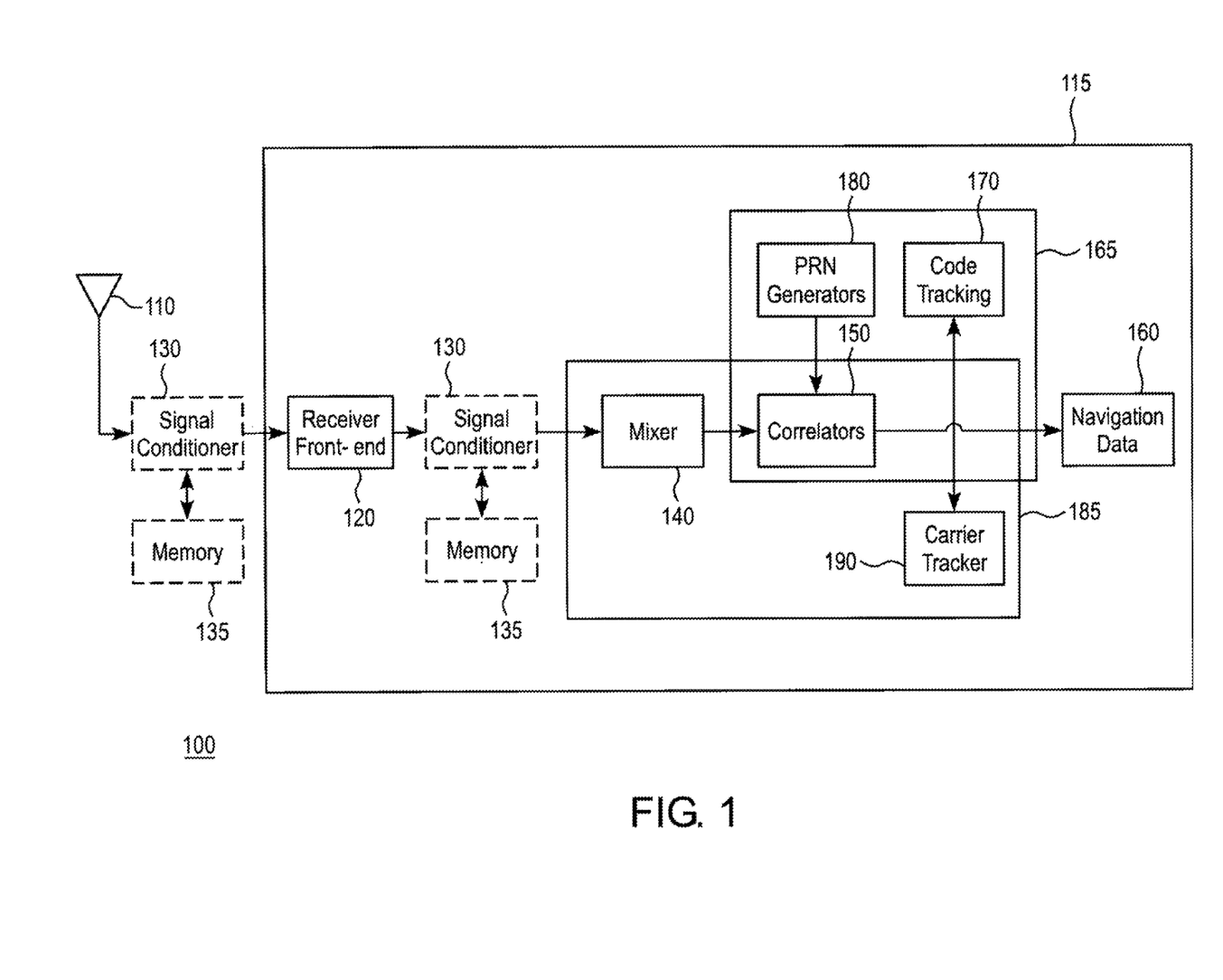
FIG. 1 is a block diagram of a Global Positioning System (GPS) receiver system in accordance with an exemplary embodiment.

FIG. 1 is a block diagram of a Global Positioning System (GPS) receiver system in accordance with an exemplary embodiment. As shown in FIG. 1, the GPS 100 includes an antenna 110, and a receiver 115 having a receiver front-end processor 120, signal conditioner 130, mixer 140, a correlating unit 150, a navigation data unit 160, a code tracker 170 and code tracking loop 165, and a carrier tracker 190 and carrier tracking loop 185.

The antenna 110 converts electromagnetic energy received from GPS satellites to electrical current. The electromagnetic energy includes radio frequency (RF) signals, which are weak given the distance from the satellite to the antenna. The RF signals are a combination of a desired signal $y_n(t)$, an interference signal i(t), and noise η(t), which can be given by, $$s(t) = \sum_{n=1}^{N} y_n(t) + i(t) + \eta(t) \quad (1)$$

The desired signal y(t) can include a carrier, ranging codes, is the aggregate of individual signals transmitted from GPS satellite vehicles within the view of the receiver. By decoding the time of week and satellite ephemeris data, in conjunction with the measured propagation delay, a pseudorange is computed for each satellite vehicle. A position estimation algorithm is employed to determine the receiver position from these pseudoranges.

The interference signal i(t) contributes RF power into the bandwidth of the receiver, reducing the signal quality of the GPS signals. This signal can be expressed as a complex sinusoid.

$$i(t) = A(t)e^{j(\omega(t)t + \phi(t))}, \quad (2)$$

where the amplitude (A), frequency (ω), and phase (φ) are time dependent parameters.

The front-end processor 120 of the receiver 115 is configured to include circuitry for down-converting the received signal to an intermediate frequency, sampling, and then quantizing the signal for further processing. The front-end processor 120 can include a pre-amplifier for strengthening the received RF signals, and a filter to suppress unwanted RF signals. Known front-end processing circuits can also include a reference or local oscillator (LO) for generating a pure sinusoidal signal for down-conversion of the received RF signals. The down-converter can mix the received RF signals with the LO to generate the intermediate frequency (IF) signal from the received RF signal. The down-converter can include a plurality of stages that reduce the carrier frequency of the received RF signal in steps. Unwanted signals can be filtered and once the desired IF signal is obtained, it can be converted to a digital signal via an analog-to-digital converter.

According to exemplary embodiments described herein, the signal conditioner 130 receives the digital signal from the front-end processor 120 and is configured to condition the raw RF samples output from the front-end processor 120. The signal conditioner can include a filter bank configured to decompose, analyze, and suppress interference signals, the details of which are described below. As shown in FIG. 1, the signal conditioner 130 can be a stand-alone component (e.g., processor) or be integrated into the receiver 115. When configured as a standalone component, the signal conditioner 130 is arranged between the antenna 110 and the receiver 115 and requires its own receiver front-end and digital-to-analog conversion circuitry. The signal conditioner 130 can include on-board or external memory 135 for storing filter parameters, a look-up table, and reference signals/wavelets used in analyzing the processed signal at various points and stages of the filtering process.

The mixer 140, correlating unit 150, code tracking loop 165, and carrier tracking loop 185 operate together to synchronize the receiver with the signal output from the signal conditioner 130. The code tracking loop 165 includes a code tracking unit 170, a pseudo random-noise (PRN) generator unit 180, and the correlator 150 to enable extracting the broadcast message from the GPS signals. The code tracking unit 170 can implement a delay lock for following the code delay of the received RF signal enabling calculation of a pseudorange. The carrier tracking loop includes the mixer 140, the correlator unit 150, and a carrier tracking unit 190. The carrier tracking unit 190 uses a phase or frequency lock loop for tracking a carrier phase the carrier frequency of the received RF signal.

The navigation data unit 160 processes the navigation solution and stores data obtained from the received RF signal. The data can include information on satellite position and velocity, clock bias parameters, satellite health status, and almanac data which allows the coordinates of the satellite to be computed.

Figure 2:
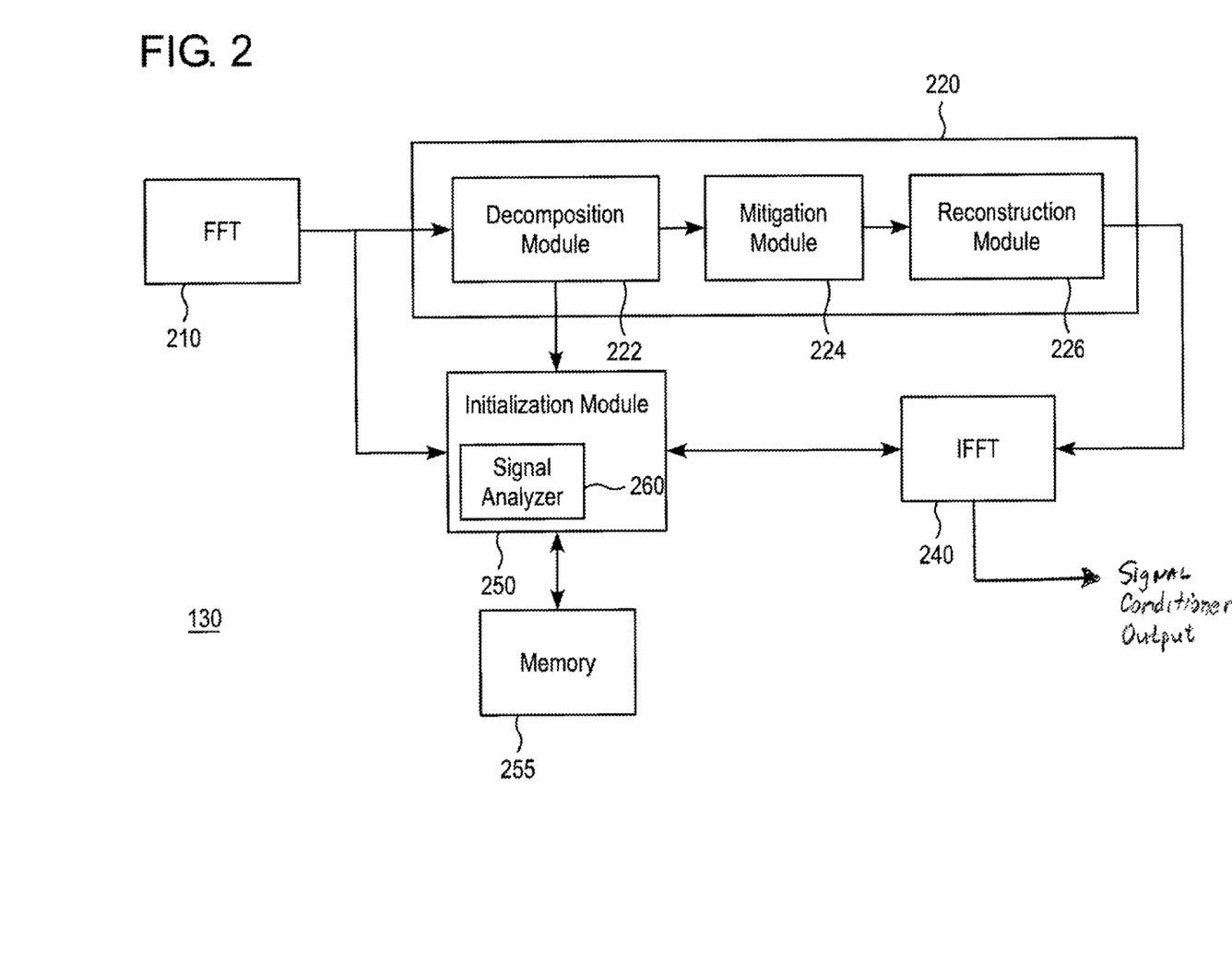
FIG. 2 is a block diagram illustrating the Signal Conditioner in accordance with an exemplary embodiment.

FIG. 2 is a block diagram illustrating a signal conditioner in accordance with an exemplary embodiment. As shown in FIG. 2, the signal conditioner 130 includes an input Fourier transformer (FFT) 210 for measuring the frequency content of the RF signal output from the front-end processor 120. The FFT 210 generates the frequency domain representation of the RF signal by summing the product of the signal sample by sample with a complex sinusoid of frequency ω. The FFT 210 can be represented as.

$$X[k] = \sum_{n=0}^{N} x_n e^{-j\omega \frac{kn}{N}} \quad (4)$$

where $x_n$ is a digital sample of the received signal and N is the total number of samples being processed. In an exemplary embodiment the signal conditioner 130 can include a buffer upstream of the FFT.

The output of the FFT 210 is provided to a filter bank 220. The filter bank 220 is configured to include a plurality of signal processing stages. Each stage includes a low-pass channel H(ω) and a high-pass channel of analytic filters G(ω) and G*(−ω). The low-pass and high-pass channels establish a decomposition and analysis module (DAM) 222, for separating the RF signal into a plurality of sub-bands (e.g., channels) and analyzing the time-frequency content contained therein. Each sub-band is configured to operate on complex components of the decomposed RF signal. The DAM 222 includes a bank of discrete wavelet transformers (DWT) to decompose the signal into a plurality of time-frequency spaces (e.g., scales), which allow for separating time-frequency content of the desired signal $y_n(t)$ from frequency content of the interference signal i(t). Each DWT of the filter bank 220 can be given by:

$$X_{(a,b)} = \frac{1}{\sqrt{a}} \sum_R x[n] \gamma^* \left( \frac{n-b}{a} \right) \quad (5)$$

where $\gamma_{(a,b)}$ is a time-limited, oscillatory waveform (e.g., wavelet). The wavelet is scaled (e.g., dilated or compressed) by parameter (e.g., factor) a, and shifted (e.g., translated) by parameter b to generate a derivative wavelet. Each DWT maps the signal to the time-frequency domain by correlating the signal with this wavelet, localizing the signal in both time and frequency. Increasing the scaling parameter a, dilates (e.g., widens) the wavelet in time and provides for analyzing low frequency components and longer durations resulting in good frequency resolution and poor time resolution. Decreasing the scaling parameter a compresses (e.g., narrows) the wavelet and provides for analyzing high frequency components and short durations resulting in poor frequency resolution and good time resolution.

The response of each channel is determined by scaling the wavelet in conjunction with a frequency shifting term. As is known in the art, time and frequency requirements and time-frequency coverage of the filter bank is defined by resampling rates p, q, r, and s, "quality" factor β, "chirp" factor γ, and the desired number of stages to process the signal. The quality factor β is given by $$\beta = \frac{\omega_c}{BW_i}, \quad (6)$$

where $\omega_c$ is the center frequency, and BW is the bandwidth. The chirp factor specifies the rate at which the frequency of the signal increases or decreases with time.

Because the signal output from the FFT 210 includes in-phase (I) and quadrature-phase (Q) components, the filter bank 220 can be configured to include multiple filter banks, each configured to process one of the I and Q components output from the FFT 210.

Figure 3A:
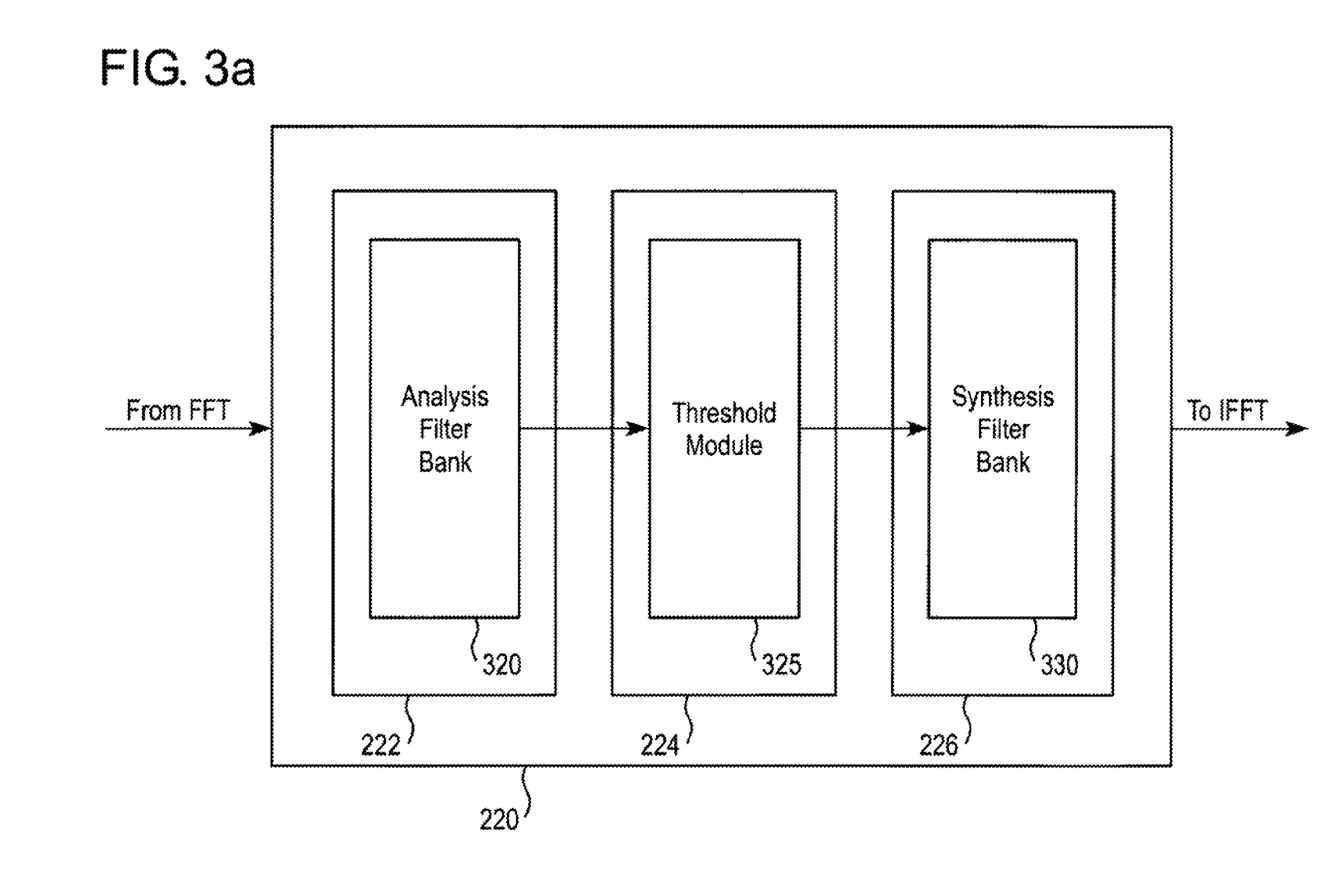
FIG. 3a is a block diagram of a filter bank for performing signal conditioning in accordance with an exemplary embodiment.

FIG. 3a is a block diagram of a filter bank for performing signal conditioning in accordance with an exemplary embodiment. As shown in FIG. 3a, the filter bank 220 includes an analysis filter bank 320, a thresholding module 325, and a synthesis filter bank 330. The analysis filter bank 320 is encompassed in the DAM 222 and includes a plurality of sub-stages of the total stages J of the filter. In the analysis filter, the signal is split into a plurality of sub-bands where the signal is resampled (upsampled or downsampled), filtered, and scaled (scaled up or down) such that frequency domain specific bins (e.g., time-frequency cells) are selected for time-frequency analysis of the respective signals. The filter includes the low-pass channel $310_H$ that decomposes the frequency space at each stage, and a high-pass channel $310_G$ using an analytic filter pair $G^{(n)}(\omega)$ and $G^{(n)*}(-\omega)$ for analysis of the decomposed signal. The filter can also include a plurality of stages J, selected to provide the spectral coverage for the wavelet analysis.

Figure 3B:
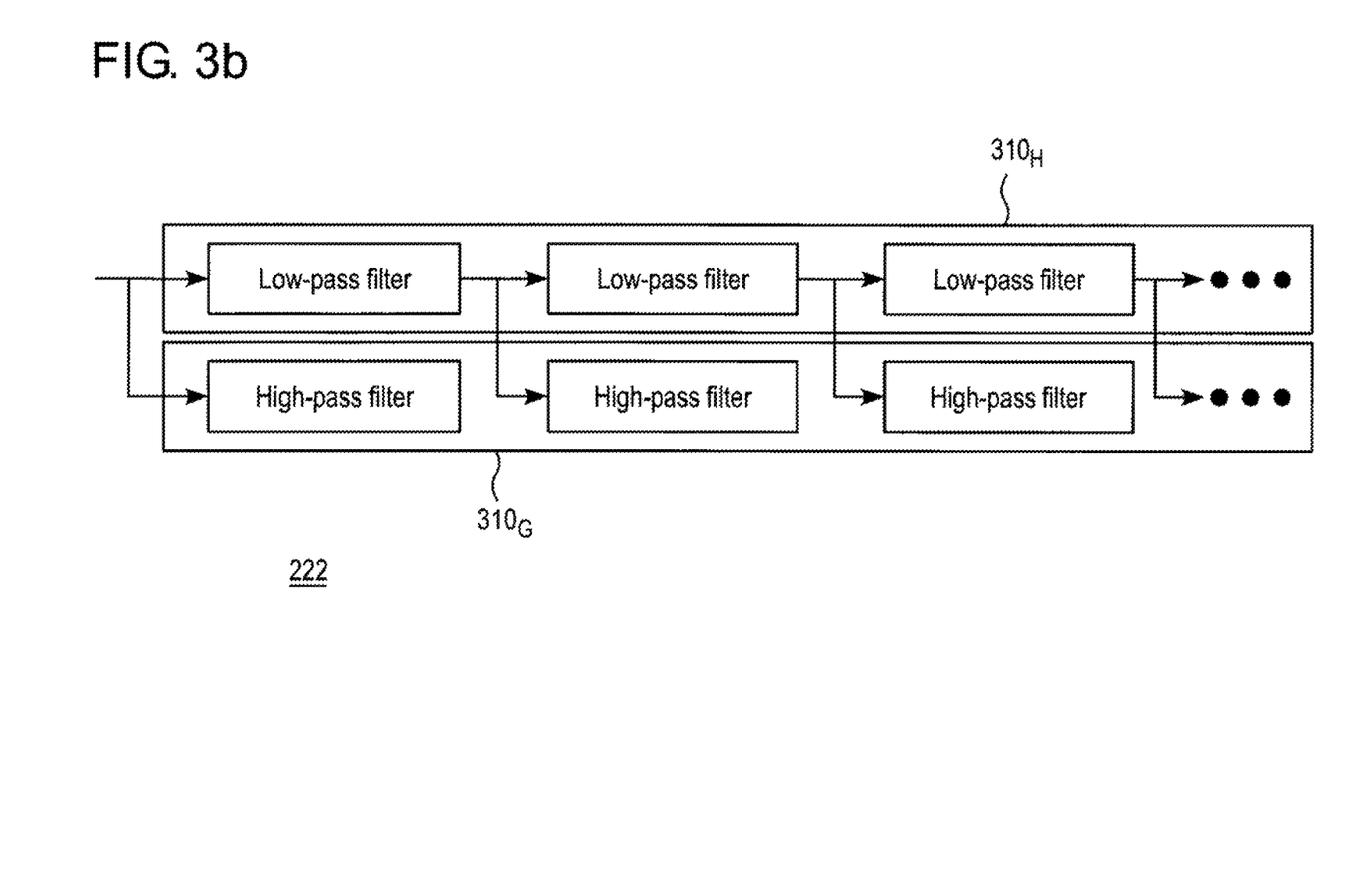
FIG. 3b is a block diagram of a filter for performing decomposition and mitigation in the filter bank for performing signal conditioning in accordance with an exemplary embodiment.

FIG. 3b is a block diagram of a filter for performing decomposition and mitigation in a filter bank for performing signal conditioning in accordance with an exemplary embodiment. As shown in FIG. 3b, the filter can include the low-pass channel $310_H$ to decompose the frequency space at each stage, and a high-pass channel $310_G$ using an analytic filter pair $G^{(n)}(\omega)$ and $G^{(n)*}(-\omega)$ for analysis of the decomposed signal. The filter can also include a plurality of stages J, selected to provide the spectral coverage for the wavelet analysis. The analysis filter bank includes a plurality of stages implementing the low- and high-pass channels $310_H$ and $310_G$, respectively, as shown in FIG. 3b.

The thresholding algorithm 325 is encompassed in the mitigation module 224 and receives the signal from the analysis filter bank 320 and suppresses the interference signal of each sub-band by zeroing coefficients within each time-frequency cell.

The synthesis filter bank 330 is encompassed in the reconstruction module 226 and is configured to reconstruct the received signal. The reconstructed signal includes the desired signal (t) minus the interference signal (t). The synthesis filter bank 330 applies an inverse DWT to each time-frequency cell of the sub-bands established in the analysis filter bank 320. In the synthesis filter bank the signal output from the thresholding module 325, is re-scaled (scaled in opposite direction (up or down) from analysis filter bank 320), resampled (sampled in opposite direction from analysis filter bank 320), and passed through the inverse filter to generate the received signal. For example, the synthesis filter bank 330 can include inverse low-pass filter and high-pass filters of those included in the analysis filter bank 330. For example, the low-pass filter of the synthesis filter bank 330 can have a frequency domain of $H^{(n)*}(\omega)$ and the high-pass filter having a frequency domain of $G^{(n)*}(\omega)$ for positive frequency channels and $G^{(n)*}(-\omega)$ for negative frequency channels.

The signals output from each sub-band (e.g., channel) are summed. A signal x'[n] representative of the original signal s(t) minus the interference signal i(t) is generated by applying an inverse Fourier transform (IFFT) 240 to the output of the sum of the sub-band outputs.

According to yet another exemplary embodiment of the present disclosure, DAM 222 can be configured such the analysis filters 320 include a plurality of band-pass filters. For each stage, the plurality of band-pass filters can be configured to cover the entire bandwidth of the stage. As a result, the filter bank leverages the varying time and frequency-resolution across the entire spectrum rather than only a selected portion of the spectrum. As such, a complete decomposition of the received RF signal can be achieved.

An initialization module 250 can be configured to initialize each filter bank 220 with a set of parameters defining the resampling rates p, q, r, and s, "quality" factor β, "chirp" factor γ, and the desired number of stages to process the received signal s(t). The parameters can be entered manually by an operator or obtained automatically from a memory unit 255. The memory unit 255 stores a look-up table that associates a value of the resampling rates p, q, r, and s, "quality" factor β, "chirp" factor γ, and the desired number of stages to the frequency content or profile of the desired signal $y_n(t)$.

The initialization module 250 is connected to receive an output of the FFT 210, an output of the decomposition module 222 of the filter bank 220, and an output of the IFFT 240. Through these connections, the initialization module 250 can measure performance of the system and/or method by comparing the response of the filter to the desired signal. The initialization module 250 is also configured to analyze the frequency content at an output of the FFT 210, an output of the decomposition module 222 of the filter bank 220, and an output of the IFFT 240 via signal analyzer 260 to determine whether the multi-stage filter is to be reinitialized with updated time and frequency resolution requirements to improve system response. Determining whether re-initialization of the filter should be performed can include comparing the signal-to-noise ratio (SNR) of the measured signal to the SNR of the original signal or a reference signal, comparing other frequency content of the measured signal to a reference wavelet, or any other suitable technique for evaluating performance at various stages of the filter bank as desired.

According to an exemplary embodiment, the initialization module can be configured to analyze the time-frequency domain plane prior to mitigation and at the output of the decomposition module 222, and tune the parameters until the jammer signal is localized based on predetermined criteria. For example, an analysis result finding two cells adjacent in time with a plurality of coefficients breaking the threshold can indicate that the time resolution should be broadened, which results in a tighter frequency resolution.

According to another exemplary embodiment, the plurality of parallel filter banks included in the filter bank 220 can be operated with varying parameters exhibiting different time and frequency resolution results. For example, one or more of the parallel filter banks is initialized with at least one parameter, for example the chirp factor γ, that is different from another of the parallel filter banks. The output of each filter bank is compared with a reference to identify a set of parameters that results in a closest correlation (e.g., provides the best response), or a correlation that is within a predetermined tolerance (e.g., ±5%). For example, when comparing histograms of the signal prior to signal processing (e.g., at input of FFT 210) and after signal processing (e.g., at output of IFFT 240), if a difference between the values is within ±5% then the associated parameters can be deemed to provide a best response. The set of parameters that results in the best response is selected and each of the plurality of parallel filter banks in the filter bank 220 is reinitialized with the selected set of parameters. The post-signal processing histograms of past analyses can be stored in memory 135 in association with a set of parameters. Prior to or during reinitialization these histograms can be compared with a pre-signal processing histogram of a received signals to determine whether a set of parameters can generate a better response.

According to another exemplary embodiment, the initialization module 250 can be configured to monitor the output of the FFT 210 for excursions (e.g., deviations) and determine a chirp factor γ based on the span of frequency bins crossed per observation period. The initialization module 250 can reinitialize the filter bank 220 by selecting from a look-up table stored in memory, the set of parameters including the chirp factor γ obtained in the determination. For example, the performance of the filter can be measured by extracting samples from the received signal s(t) prior to and after signal processing. A distribution of the samples (e.g., histogram) taken pre-signal conditioning can be compared to a distribution of the samples taken post-signal conditioning. The results of the comparison can be used to select new parameters. For example, if the frequency distribution of the samples indicates that the presence of an interference signal, then the initialization module 250 can select different parameters that increase or decrease the value of any combination of the sampling factor, scaling factor, and number of stages.

Figure 4:
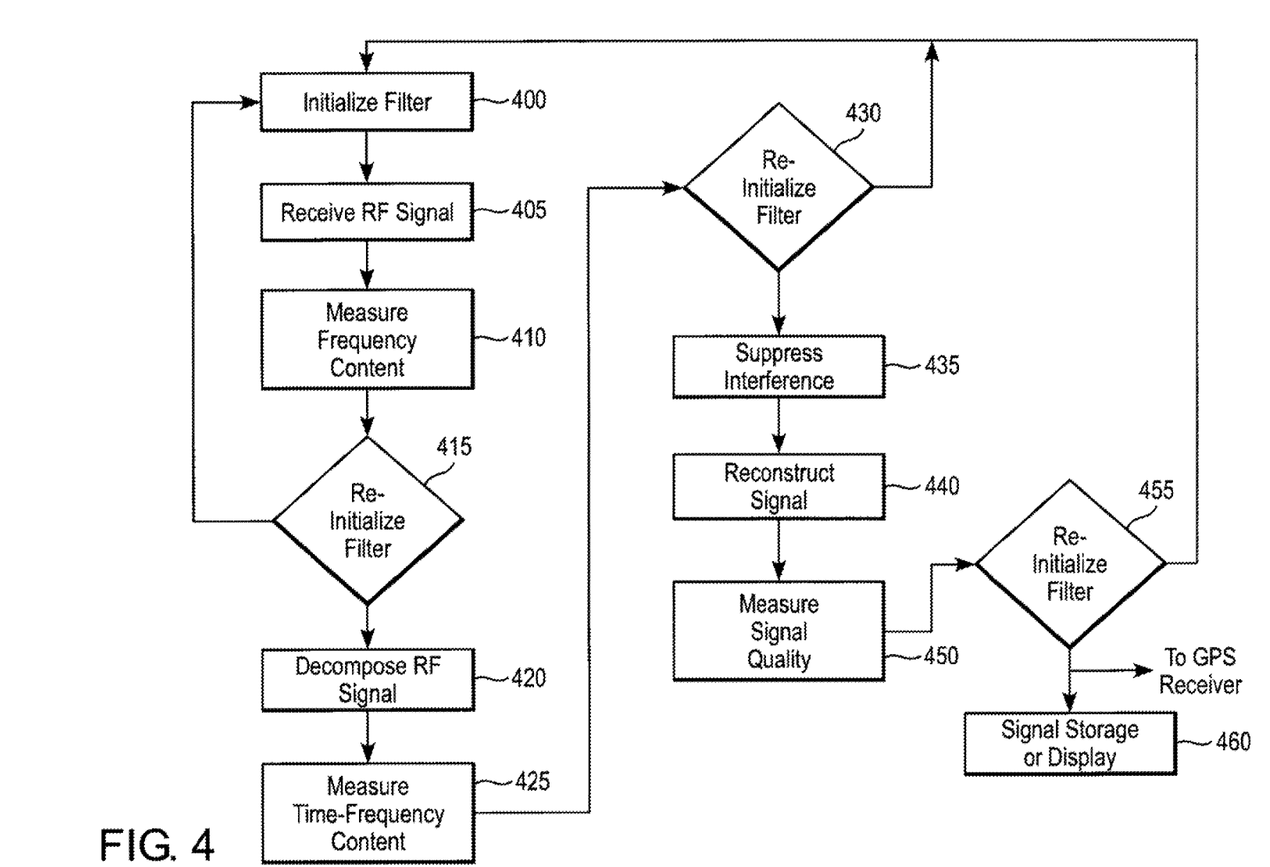
FIG. 4 is a flow chart illustrating a method for interference suppression in accordance with an exemplary embodiment.

FIG. 4 is a flow chart illustrating a method for interference suppression in accordance with an exemplary embodiment. In configuring the system for signal processing, the filter bank is initialized by estimating time and frequency resolution requirements (400). The estimation can include determining the set of parameters best suited for totally mitigating or at least substantially mitigating an interference signal from a received RF signal s(t). Following configuration, the RF at a desired frequency band (e.g., signal of interest) is received via the antenna 110 (405). The frequency components of the received RF signal s(t) include at least the desired signal $y_n(t)$ and an interference signal i(t).

The received RF signal is processed in the receiver front end 120 and output to the signal conditioner 130, which measures the frequency content of the RF signal by performing a Fourier transform (410). The frequency content of the received signal is correlated to a reference wavelet, and based on a score and/or predetermined tolerance it is determined what part of the signal bandwidth the interference signal occupies. When the location of the interference signal is specified it is determined whether a new set of parameters should be used to improve filter response (e.g., frequency-resolution based on the bandwidth of the interference signal) in mitigating the interference signal (415). If re-initialization is specified, then processing returns to step 400. Otherwise, processing of the received RF signal continues at the DAM 222 of the filter bank 220 in the signal conditioner 130, which separates (e.g., decomposes) the RF signal into a plurality of sub-bands. The DAM 222 is configured to decompose complex frequency components of the received RF signal into a plurality of time-frequency cells (e.g., scales), which separates frequency content of the desired signal $y_n(t)$ from frequency content of the interference signal i(t) (420). The frequency content of the interference signal i(t) can again be analyzed based on a comparison with a reference wavelet to determine whether the filter bank should be re-initialized (425) with different parameters to improve mitigation. According to another exemplary embodiment, the quality of the received signal can be analyzed, by comparing the signal-to-noise ratio of the received signal to the signal output from the DAM 222. If the correlation result indicates re-initialization is specified, then processing returns to step S400 (430). Otherwise, the signal conditioner 130 continues processing the signal in the mitigation module 224 of the filter bank 220.

The mitigation module 224 suppresses the interference signal of each sub-band by zeroing coefficients within a time-frequency cell when the correlation exceeds a predetermined threshold (435). Following suppression of the interference signal i(t), the signal is reconstructed in the reconstruction module 226 by applying an inverse DWT to each time-frequency cell (440). The IFFT 230 is applied to the output of the reconstruction module 226 to obtain the original signal having the interference frequency components suppressed). The signal quality of the RF signal can be analyzed to determine whether the filter bank should be re-initialized (450). For example, a histogram of samples taken prior to and after the signal conditioning can be compared. If the comparison result indicates that the interference signal is not mitigated or mitigated sufficiently, the filter bank 220 can be reinitialized with new parameter values with processing returning to step 400 (455). According to another exemplary embodiment of the present disclosure, If re-initialization of the output is not specified, the signal flow is output to memory and/or a display for further analysis (460).

According to exemplary embodiments of the present disclosure, components of the system as illustrated in FIG. 1, including the signal conditioner 200 illustrated in FIG. 2 can include one or more of any known general purpose processors or integrated circuits such as a central processing unit (CPU), microprocessor, field programmable gate array (FPGA), Application Specific Integrated Circuit (ASIC), or other suitable programmable processing or computing device or circuit as desired, which are configured (e.g., programmed, coded) to perform digital signal processing operations. The general purpose processor(s) can be configured to include and perform features of the exemplary embodiments of the present disclosure such as, mitigating interference in an RF signal, and thereby function as a special and unique processor. If the described embodiments are applied to an existing system, then the special unique processor can be disposed between the antenna 110 and receiver front end 120 as shown in FIG. 1. If the receiver is engineered to include the exemplary embodiments described herein, then the signal conditioning can be implemented following the receiver-front end 120. The features can be performed through program code encoded or recorded on the processor(s), or stored in a non-volatile memory device, such as Read-Only Memory (ROM), erasable programmable read-only memory (EPROM), or other suitable memory device or circuit as desired. In another exemplary embodiment, the program code can be provided in a computer program product having a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor(s) for execution as desired, when the non-transitory computer readable medium is placed in communicable contact with the processor(s).

Figure 5A:
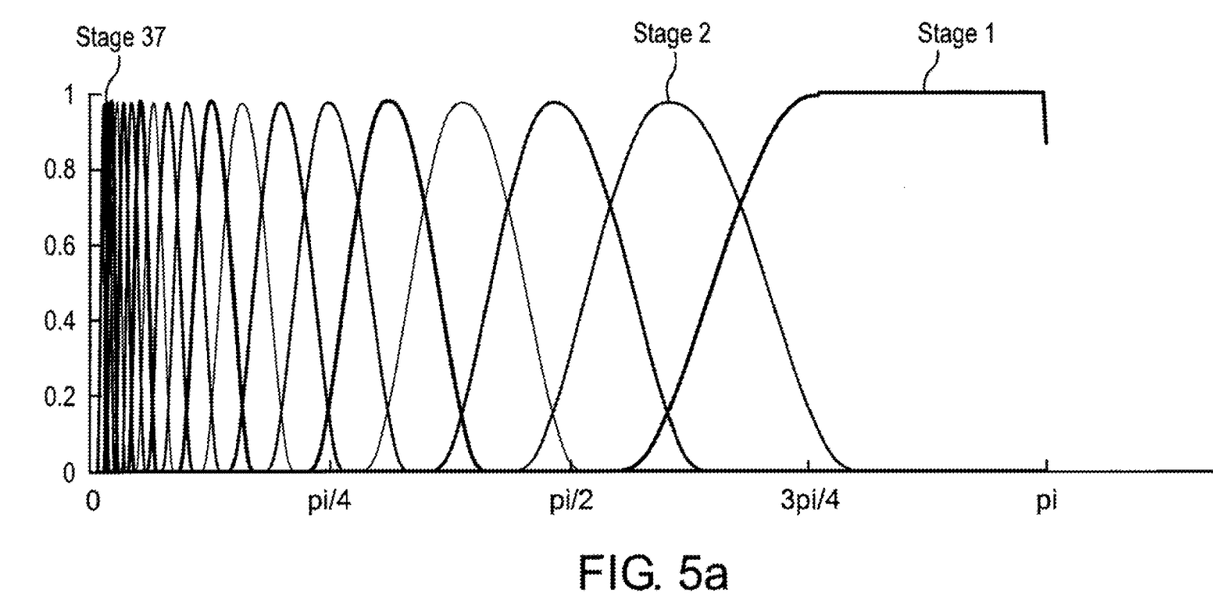
FIG. 5a is a plot illustrating the frequency spectrum of an RF signal processed under a first set of filter parameters in accordance with an exemplary embodiment.
Figure 5B:
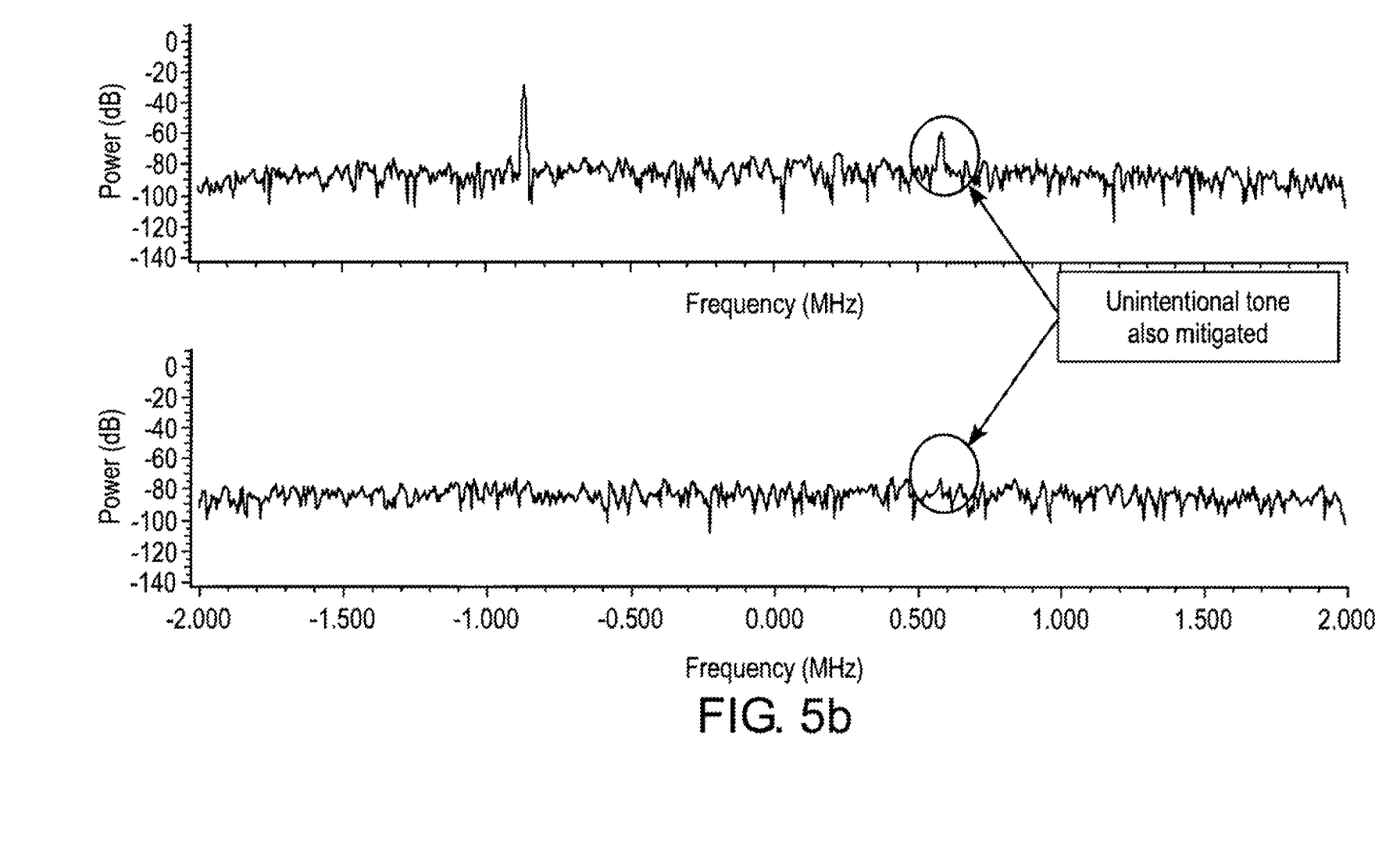
FIG. 5b illustrates spectrum plots of the original signal (top graph) and clean signal (lower graph) processed under the first set of filter parameters in accordance with an exemplary embodiment.

According to an exemplary embodiment of the present disclosure, an exemplary filter bank can be configured for mitigating GPS jammer signals having a frequency offset greater than 1.2 kHz. For example, the filter bank can be configured to include 37 stages with parameters (p, q) and (r, s) having values (156, 190) and (4, 10), respectively. The "quality" factor $\beta$ can be set to 0.8, and the "chirp" factor $\gamma$ can be set to 1. FIG. 5a is a plot illustrating the frequency spectrum of an RF signal processed under a first set of filter parameters in accordance with an exemplary embodiment. FIG. 5b illustrates graphs of the original signal (top graph) and clean signal (lower graph) processed under a first set of filter parameters in accordance with an exemplary embodiment. As shown in FIG. 5b, the filter parameters suppressed two interference signals in the original waveform. The filter parameters associated with the graphs of FIGS. 5a and 5b, can be suitable for suppressing jamming waveforms (e.g., stationary tones, swept tone, hopped tones, and pulsed tones of varying parameters) having pulse rates of 10 ms and sweep/hop rates up to 1 MHz/1 ms.

Figure 6A:
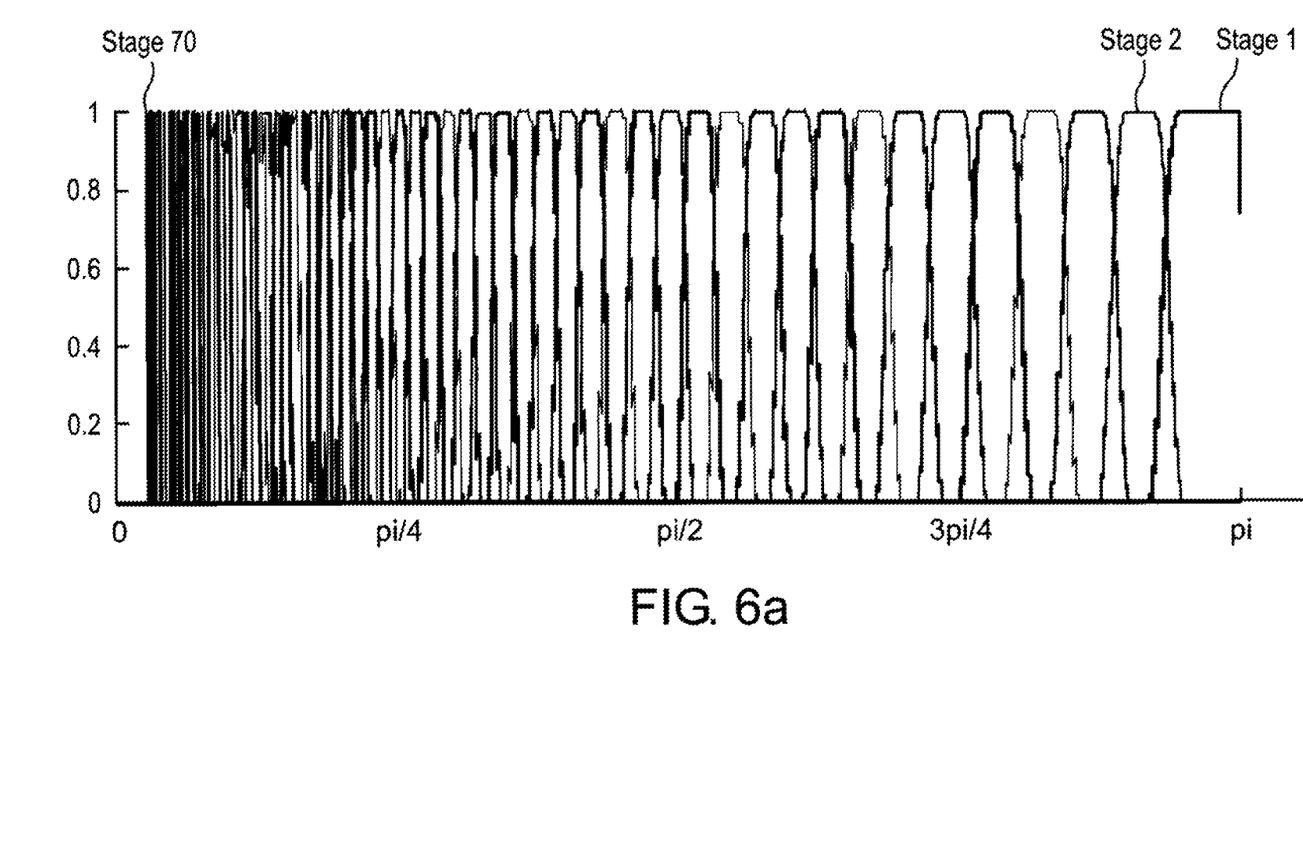
FIG. 6a is a plot illustrating the frequency spectrum of an RF signal processed under a second set of filter parameters in accordance with an exemplary embodiment.
Figure 6B:
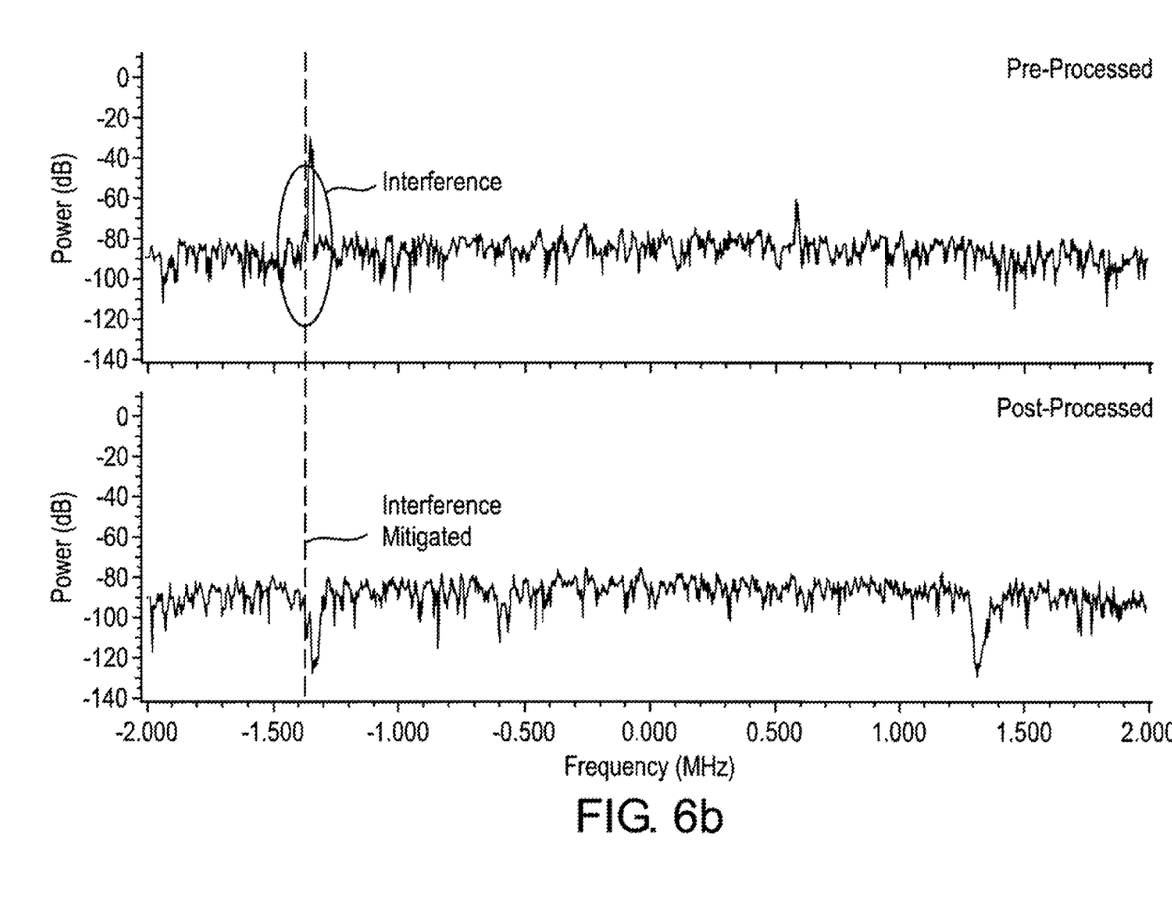
FIG. 6b illustrates spectrum plots of the original signal (top graph) and clean signal (lower graph) processed under the second set of filter parameters in accordance with an exemplary embodiment.

According to another exemplary embodiment of the present disclosure, an exemplary filter bank can be configured for mitigating jammer signals having a frequency offset greater than 1.2 kHz. For example, the filter bank can be configured to include 70 stages with parameters (p, q) and (r, s) having values (190, 200) and (1, 10), respectively. The "quality" factor $\beta$ can be set to 0.8, and the "chirp" factor $\gamma$ can be set to 1. FIG. 6a is a plot illustrating the frequency spectrum of an RF signal processed under a second set of filter parameters in accordance with an exemplary embodiment. FIG. 6b illustrates plots of the original signal (top graph) and clean signal (lower graph) processed under the second set of filter parameters in accordance with an exemplary embodiment.

Distortion can result from an incomplete reconstruction of the signal. The signal degradation resulting from the distortion, however, is minimal as compared to the negative impact of the jammer signal. During tests, it was found that even with some distortion, the improvement in GPS signal quality is sufficient to mitigate the impact of the jammer signal and thereby improve the original signal, which contained the interfering signal. It is also noted that the center frequency cannot be fully covered by the filter bank 330. A notch filter could be implemented to ensure suppression of jamming power in this bandwidth.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for mitigating interference in an RF signal, the method comprising:
   initializing a filter for processing a desired signal by estimating time and frequency resolution requirements based on at least a quality factor and chirp factor;
   receiving the RF signal in a desired frequency band, the RF signal including at least the desired signal and an interference signal;
   measuring the frequency content of the RF signal;
   decomposing the RF signal into a plurality of sub-bands via the filter, each sub-band being configured to operate on complex components of the decomposed RF signal, and having a plurality of filter stages where each stage is scaled for separating frequency content of the desired signal from frequency content of the interference signal;
   suppressing the interference signal of each sub-band by zeroing an output of a sub-band when the respective frequency content exceeds a predetermined threshold;
   reconstructing the decomposed RF signal and generating a filter response; and
   correlating a filter response to the desired signal,
   wherein one of the frequency content of the RF signal, the frequency content of the decomposed RF signal, or the filter response is analyzed to determine whether the filter is to be reinitialized with updated time and frequency resolution requirements to improve the filter response.

2. The method of claim 1, wherein the filter includes at least one low-pass channel and a plurality of high-pass channels at each stage, and the time and frequency resolution requirements are defined by at least sampling parameters, the quality factor, the chirp factor, and a threshold value.

3. The method of claim 2, wherein the complex components of the decomposed RF signal include real (I) and imaginary (Q) samples and the filter includes separate filter banks for processing the I and Q samples.

4. The method of claim 1, wherein the filter includes at least one low-pass channel and at least one band-pass channel at each stage, and the time and frequency resolution requirements are defined by at least sampling parameters, the quality factor, the chirp factor, and a threshold value.

5. The method of claim 1, wherein determining whether to reinitialize the filter includes analyzing a time-frequency domain of the desired signal between decomposition of the RF signal and suppression of the interference signal, and tuning the parameters until the frequency content of the desired signal and the frequency content of the interference signal are localized within respective windows.

6. The method of claim 1, wherein the filter includes a plurality of filter banks each initialized with a respective set of parameters, and determining whether to reinitialize the filter includes monitoring an output of each filter bank to identify a set of parameters that results in a closest correlation of between the filter output and a reference wavelet, wherein the respective set of parameters for each filter bank is different in at least the sampling parameters and the chirp factor.

7. The method of claim 1, wherein determining whether to reinitialize the filter includes monitoring the measured frequency content of the RF signal prior to decomposition and determining the chirp factor based on a number of frequency bins crossed within an observation period.

8. The method of claim 1, comprising:
   down-converting and quantizing the received RF signal, and storing complex samples of the RF signal before the frequency content of the RF signal is measured.

9. The method of claim 1, wherein the filter is a multi-stage discrete wavelet transform.

10. The method of claim 1, wherein the response of the filter represents the received RF signal minus the interference signal.

11. A system for mitigating interference in an RF signal that includes at least a desired signal and interference, comprising:
a receiver configured to include:
a decomposition module that decomposes a received RF signal into sub-bands via a multi-stage filter initialized based on at least a quality factor and a chirp factor, each sub-band being configured to operate on real and imaginary components of the RF signal, and each stage being scaled for separating frequency content of the desired signal from frequency content of the interference;
a mitigation module that suppresses the interference of the RF signal in each sub-band by zeroing an output of a respective sub-band when the frequency content exceeds a predetermined threshold; and
a reconstruction module that reconstructs the RF signal from the mitigation module and generates a filter response including RF signal minus the interference,
wherein the receiver is configured to:
compare the filter response to the desired signal to measure system performance; and
analyze one of frequency content of the received RF signal, the frequency content of the decomposed RF signal, or the filter response to determine whether the multi-stage filter is to be reinitialized with updated time and frequency resolution requirements including the chirp factor to improve system response.

12. The system of claim 11, wherein the multi-stage filter is configured to include at least one low-pass channel and a plurality of high-pass channels at each stage, and the time and frequency resolution requirements are defined by at least sampling parameters, the quality factor, the chirp factor, and a threshold value.

13. The system of claim 11, wherein the multi-stage filter is configured to include at least one low-pass channel and at least one band-pass channel at each stage, and the time and frequency resolution requirements are defined by at least sampling parameters, the quality factor, the chirp factor, and a threshold value.

14. The system of claim 11, wherein the receiver is configured to generate an output correlating the filter response with the desired signal.

15. The system of claim 11, wherein the receiver is configured to:
analyze a time-frequency domain of the RF signal between decomposition of the RF signal and suppression of the interference; and
tune a set of parameters of the multi-stage filter so that within each sub-band the frequency content of the desired signal and the frequency content of the interference are localized within respective windows.

16. The system of claim 11, wherein the multi-stage filter includes a plurality of filter banks and the receiver is configured to:
initialize each filter bank with a respective set of parameters; and
determine whether to reinitialize the multi-stage filter by monitoring an output of each filter bank to identify a set of parameters that results in a closest correlation of between the filter output and a reference wavelet, wherein the respective set of parameters for each filter bank is different in at least sampling parameters and the chirp factor.

17. The system of claim 11, wherein receiver is configured to:
monitor the measured frequency content of the received RF signal prior to decomposition; and
determine a chirp factor based on a number of frequency bins crossed within an observation period.

18. The system of claim 11, comprising:
a memory unit that stores a look-up table associating a set of parameters to frequency content of a received signal, wherein the set of parameters includes at least sampling parameters, the quality factor, and the chirp factor.

19. A processor, comprising:
a decomposition module configured to decompose a received RF signal into sub-bands via a multi-stage filter initialized based on at least a quality factor and a chirp factor, each sub-band being configured to operate on real and imaginary components of the RF signal, and each stage being scaled for separating frequency content of the desired signal from frequency content of the interference signal;
a mitigation module configured to suppress the interference of the RF signal in each sub-band by zeroing an output of a respective sub-band when the frequency content exceeds a predetermined threshold;
a reconstruction module configured to reconstruct the RF signal from the mitigation module and generate a filter response including RF signal minus the interference; and
a signal analyzer module configured to compare the filter response to the desired signal to measure system performance and analyze one of frequency content of the received RF signal, the frequency content of the decomposed RF signal, or the filter response to determine whether the multi-stage filter is to be reinitialized with updated time and frequency resolution requirements to improve the filter response.

20. The processor of claim 19, wherein the signal analyzer module is configured to associate a score each response of the filter and rank each filter response against a plurality of other filter responses.

* * * * *